INVENTOR.
Alfred Korsmo
Martin Ronning
ATTORNEY.

April 25, 1939.  A. KORSMO ET AL  2,155,422
COMBINE
Filed Feb. 8, 1937  2 Sheets-Sheet 2
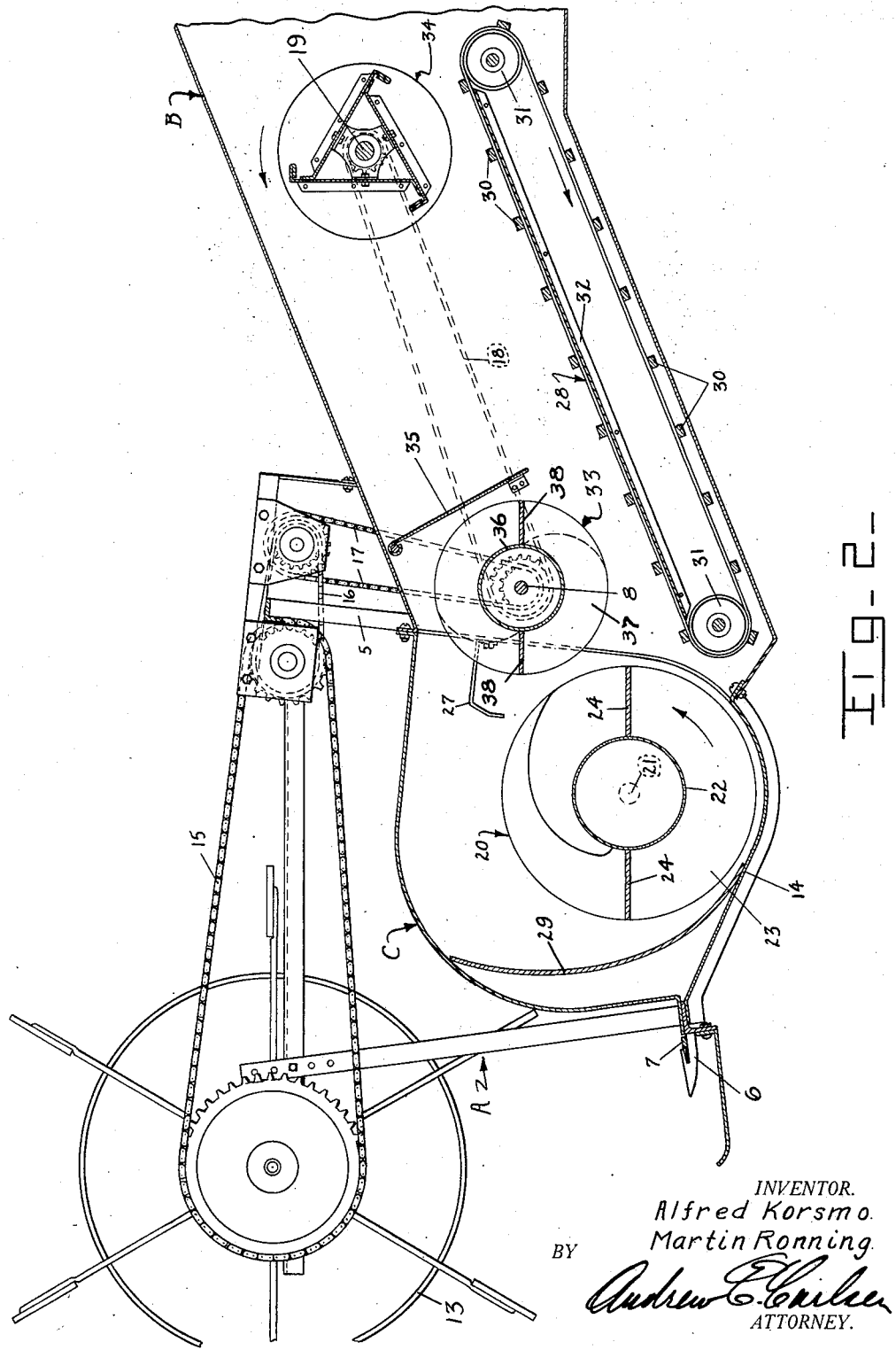
Fig-2-
INVENTOR.
Alfred Korsmo.
Martin Ronning.
BY
Andrew E. Carlsen
ATTORNEY.

Patented Apr. 25, 1939

2,155,422

UNITED STATES PATENT OFFICE 2,155,422

COMBINE

Alfred Korsmo, Hopkins, and Martin Ronning, St. Louis Park, Minn., assignors to Minneapolis-Moline Power Implement Company, Minneapolis, Minn., a corporation of Delaware Application February 8, 1937, Serial No. 124,650

8 Claims. (Cl. 198—213)

This invention relates to improvements in combination harvester-threshers, generally known as combines, and the primary object is to provide a novel, and practical apparatus to efficiently convey and feed the cut grain or crop from the harvester portion of the machine to the threshing or separating mechanism. The invention is particularly an improvement in and over the type of machine disclosed in the Martin Ronning (one of present applicants) United States Patent No. 1,959,689, granted May 22, 1934, for Combine, to which attention is directed for comparative reference purposes. Specific objects and structural features and advantages of the invention will be pointed out in the course of the following specification, reference being had to the accompanying drawings, wherein:

Fig. 2 is an enlarged sectional elevation on line 2—2 in Fig. 1.

Figure 1:
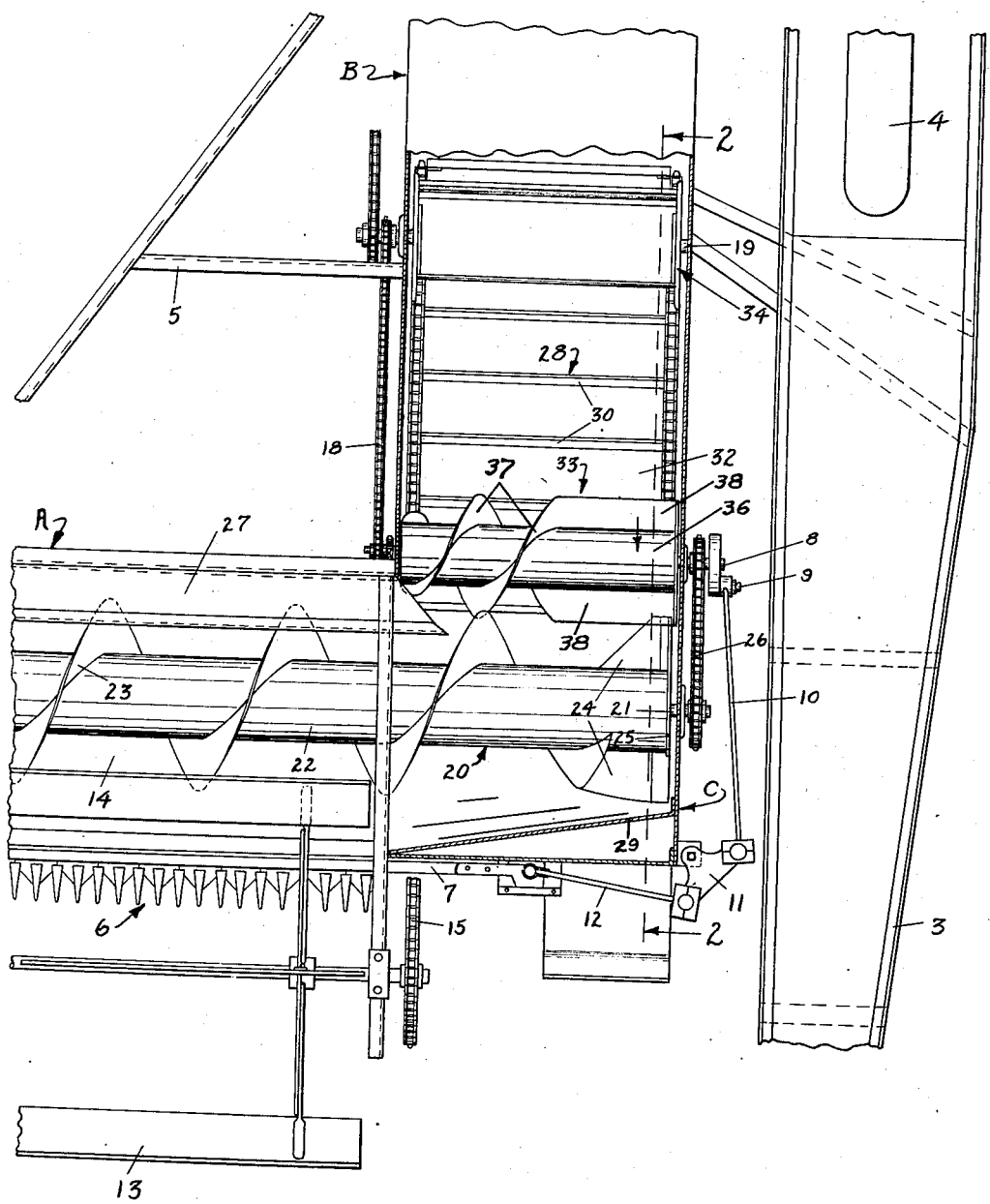
Fig. 1 is a plan view of a portion of a combination harvester-thresher or combine embodying our invention, with fractional portions broken away and other parts in section for purpose of illustration.

Referring to the drawings more particularly and by reference characters, 3 designates the draft frame and 4 one of the supporting wheels of the machine, with respect to which the implement frame 5 is tiltably mounted.

The combine includes a harvester mechanism designated generally by the character A, a separator mechanism and housing B, and a feeder housing C into which the unthreshed grain is fed laterally from the harvester and from which such grain is delivered rearwardly into the thresher or separator.

The harvester A, which heads the grain or severs the crop from the field, is of the now well known type generally disclosed in the aforesaid Ronning patent, No. 1,959,689, and includes a sickle mechanism 6 having a cutter bar 7 for heading the grain as the machine moves forwardly over the field. This cutter bar is operated from a shaft 8 through an eccentric 9, a connecting rod 10, an oscillating bell-crank lever 11, and a pitman 12. A reel 13 operates to guide the standing grain into the sickle mechanism and thereafter impels the cut heads rearwardly to the receiving platform 14. The reel is supported in any suitable manner and is here illustrated as being driven by chains 15, 16, and 17, and suitable sprockets, from the shaft 8. The shaft 8 is driven by chain 18 from shaft 19; and shaft 19, like the grain auger, raddle, and other feed elements shown, is driven by power transmitting devices of suitable or convenient design here unnecessary of detailed illustration.

As the grain cut by the sickle 6 is impelled rearwardly over the platform 14 by the reel 13 it becomes engaged by a comparatively large, transversely disposed feed auger or screw conveyor 20, which operates to convey the grain laterally into the feeder housing C. The conveyor 20 includes end stub shafts 21, a tube 22, and the screw or auger vanes 23 which terminate in flat radial end blades 24 and stop plates 25. As indicated in Fig. 1, the conveyor 20 may be driven from shaft 8 by sprocket mechanism 26. The direction of rotation of the conveyor unit 20 is anti-clockwise as viewed in Fig. 2, and in order to prevent the grain from wrapping around and rotating with the conveyor 20 we provide a guard 27 which insures longitudinal movement of the grain with respect to the conveyor in substantially the same manner as with the guard 145 in the Ronning patent, No. 1,959,689.

As the grain is moved into the feeder housing C, under the action of the conveyor 20, it is transferred to a conveyor 28 for movement rearwardly into the separating mechanism, and this transferring action is primarily effected by the blades 24, supplemented by a curved front wall 29 which is so arranged as to crowd the grain into engagement with the blades. The conveyor 28 is, in the present instance, of the raddle type in which an endless row of raddle slats 30 travel about rollers 31 and move the grain upwardly and rearwardly over an inclined floor 32.

It is of substantial importance that the grain be conveyed or transferred from the auger 20 to the separating cylinders (not shown) in an even or uniform flow, and to that end the crop delivered to the raddle conveyor 28 is subjected to the action of two feeder-beaters 33 and 34, and a metal curtain or baffle 35. The general arrangement and purposes of the devices 28, 33, 34, and 35 are substantially the same as those of the corresponding devices 53, 54, 55 and 56 of the aforesaid Ronning patent, No. 1,959,689. It will be noted, however, that in the structure of the patent (Figs. 1, 16, and 19) that the beater 54 is of the same type as 55 and projects forwardly of the harvester wall 123 with a result that it is necessary to provide a curved guard 150 adjacent the intake of the thresher "to prevent the cut grain from contacting with the ends of the feeder beater 54" as explained in the patent specification. Under many and particularly ordinary circumstances the structure of the patent will operate with satisfactory efficiency and results. It is found, however, and particularly when the machine is being operated in heavy grain that guards such as 150 in the Ronning patent have a tendency to constrict the crop movement at this point which in turn occasionally causes objectionable choking and clogging.

In an effort to overcome these difficulties we have designed the beater 33 in such a manner as to eliminate the necessity for a congesting guard, and to that end the device 33 now not only has the desired slapping or beating effect, but also has a tapered auger portion which engages the moving grain and virtually pulls it into proper feeding position with respect to conveyor 28.

More specifically the feeder-beater 33 comprises a tubular sleeve or cylinder 36 rotatable about the axis of shaft 8; and about the member 36 is fastened a pair of helical flange members 37 which terminate in radial blades 38 disposed longitudinally of and at diametrically opposite sides of the cylinder 36.

The general arrangement and operation of the machine are essentially the same as in the aforementioned Ronning patent. In the present instance, however, the grain being conveyed by the auger 20, longitudinally under the baffle plate 27, is not subjected to the restricting influence of a guard as it enters the feeder housing C, but is engaged by the helical flanges 37 which effectively cooperate with the conveyor 20 to immediately engage the grain as it leaves the baffle 27 and forcibly move it downward toward the raddle conveyor and laterally into contact with the beater blades 38. Thus a smooth, even flow of unthreshed grain is caused to pass from the harvester A, through the feeder housing C, and back into the separating mechanism.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a combine, a conveyor system for transferring grain from the cutter to the separator and comprising a feed screw for initially conveying the grain from the cutter, a conveyor for conveying the grain to the separator from the feed screw, and a separate rotary device having beater blades and a screw acting means for reception of the grain from the feed screw to carry the grain to the beater blades.

2. In a combine, a conveyor system for transferring grain from the cutter to the separator and comprising a feed screw for conveying the grain from the cutter, and a rotary feeder and beater device having beater blades and a tapering screw acting means operating alongside the feed screw for receiving the grain from the feed screw and conveying the grain to the beater blades.

3. In a combine, a conveyor system for transferring grain from the cutter to the separator and comprising a conveyor leading to the separator, a feed screw for conveying the cut grain to the conveyor, and a rotary feeder and beater operating alongside one end of the feed screw and having a screw acting means for receiving the grain from the feed screw and moving the grain in the same direction onto the conveyor.

4. In a combine, a conveyor system for transferring grain from the cutter to the separator and comprising a conveyor leading to the separator, a feed screw leading at one end to the conveyor and for initially conveying the grain from the cutter, a rotary device operating alongside the feed screw over the conveyor and including a beater having a screw acting means for receiving the grain from the feed screw and carrying the grain to the beater.

5. In a combine, a conveyor system for transferring the grain from the cutter to the separator and comprising a conveyor leading to the separator, a feed screw leading at one end to the said conveyor for initially receiving and feeding the grain toward the conveyor, a rotary device operating alongside the feed screw and including a beater and a screw acting means at the end of the beater turned toward the feed screw and in the path of the grain carried thereby to feed the grain into the beater.

6. In a combine having a feed screw for receiving cut grain and a conveyor to deliver cut grain toward the separator; a rotary feeder and beater device to assist in moving cut grain from the feed screw to said conveyor comprising helical grain engaging means terminating in beater blades, said device being disposed rearwardly with respect to the delivery end of the feed screw and rotated in a direction that will cause the helical means to cooperate with an adjacent feed screw portion in moving grain into the beater.

7. In a combine, a feeder and beater device for carrying the cut grain from the cutter feed screw to the separator conveyor and comprising a beater and coaxial helical grain engaging element rotating alongside the feed screw and with the helical element extended into the path of the grain carried by the feed screw.

8. In a combine having a feed screw for carrying the cut grain and a separator conveyor, a beater device operating alongside the feed screw over the conveyor, and a coaxial tapering, helical grain engaging element at one end of the beater device and extending into the path of grain carried by the feed screw to feed the grain directly into the beater device.

ALFRED KORSMO.
MARTIN RONNING.